Inventor
Lloyd Blackmore

June 30, 1931.  L. BLACKMORE  1,812,467
TIRE CARRIER LOCK
Filed Oct. 19, 1928  2 Sheets-Sheet 2
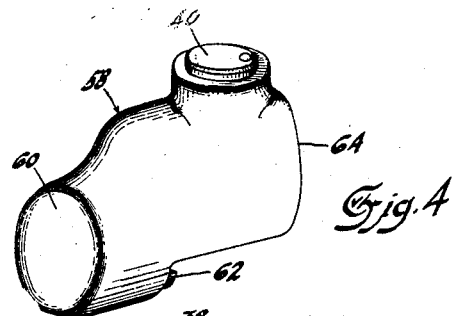
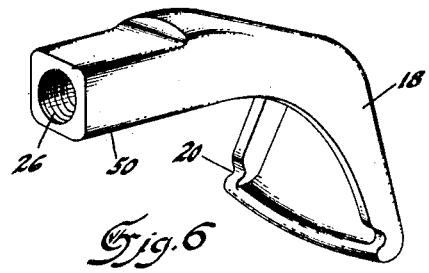
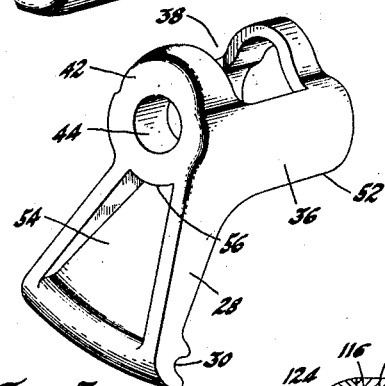
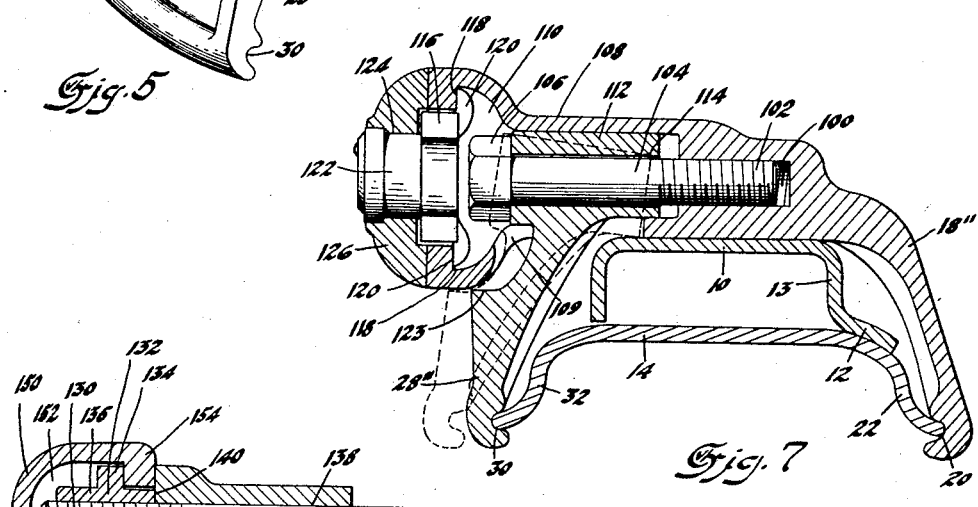
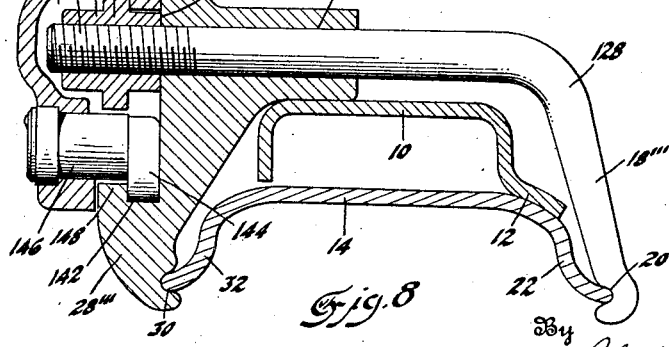
Inventor
Lloyd Blackmore
By Blackmore, Spencer & Hurd
Attorneys Patented June 30, 1931

1,812,467

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

TIRE CARRIER LOCK

Application filed October 19, 1928. Serial No. 313,506.

This invention relates to locks and has particular reference to the type of lock which is used in securing a tire and its rim to a rigidly mounted frame secured on a vehicle.

The object of the invention is to construct a lock which will conceal a bolt which is customarily used to hold together the clamps or clamping arms which receive the tire rim to rigidly hold it on to the frame.

The object of the invention is accomplished by providing a pair of arms, the ends of which are suitably shaped to grip the opposite sides of the tire rim and extend in juxtaposed relation over the permanent rim. A bolt is passed through one arm and screwthreaded into the other and a covering member placed over the juxtaposed ends concealing the head of the bolt. A lock of any suitable type is applied to prevent the removal of the parts.

The covering member and lock are capable of assuming a variety of forms, three different species of which are disclosed on the accompanying drawings.

On the drawings,

Figs. 4, 5 and 6 are perspective views of the parts of the lock shown in Fig. 3.

Figs. 7 and 8 are views corresponding to Fig. 2 of modifications.

Figure 1:
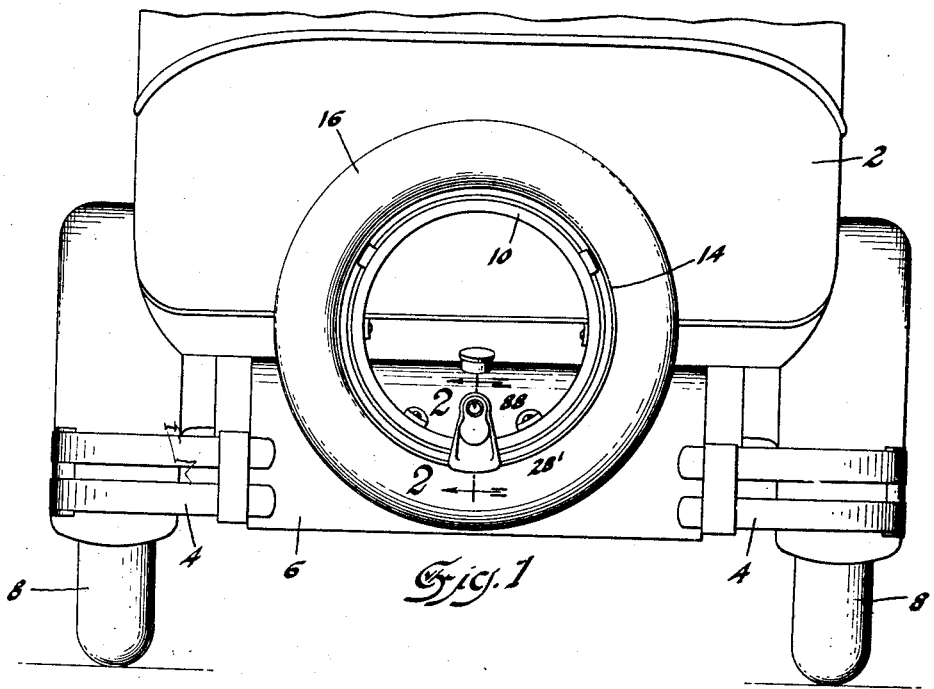
Fig. 1 shows a rear view of an automotive vehicle with the invention applied thereto.

Referring to the drawings, numeral 2 indicates an automotive vehicle provided with the rear quarter bumpers 4, gas tank 6, and wheels 8. At the rear of the gas tank there is rigidly and permanently mounted the frame 10, preferably in the form of a ring, having a lip 12 at one of the flanges 13. Over the frame 10 there is adapted to be removably seated the rim 14 having the spare tire 16. The parts so far described are conventional and per se form no part of the invention. Instead of the ring frame, a spider or other suitable type of frame may be used.

Figure 3:
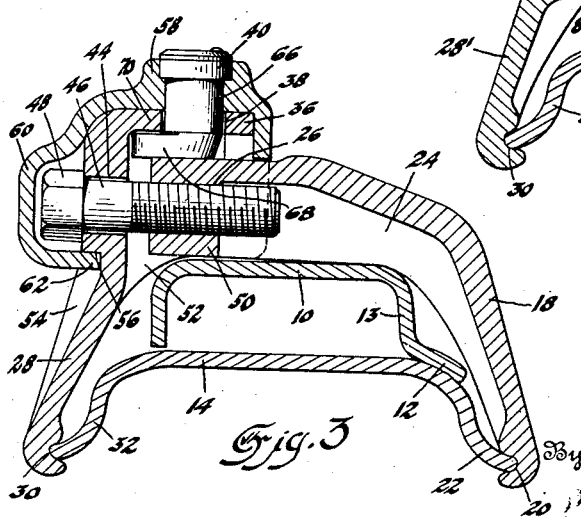
Fig. 3 is a view similar to Fig. 2 of a modification.

One form of lock is shown in Fig. 3, in which 18 indicates a clamp or clamping arm having the notched or recessed end 20 adapted to engage the flange portion 22 of the rim 14. When the rim 14 is in position on the frame 10 the arm 18 extends over the frame preferably well toward the opposite side as shown in the figure. The arm 18 is preferably dished or hollow as shown at 24 and has at its free end a screw threaded opening 26.

A second clamping arm 28 has a notched or recessed end 30 adapted to engage the second flange 32 of the rim 14. The clamping arm 28 extends upwardly at the side of both rim and frame in overlapping and juxtaposed relation to the end of the clamping arm 18. The upper end of the arm 28 is shaped as best shown in Fig. 5. The arm has the inwardly extending portion 36 the upper portion of which is provided with an opening 38 for the reception of a lock 40 as will be later described. The outside end face 42 is provided with an opening 44 for the reception of the shank of a bolt 46. The inwardly extending portion 36 is hollow and is adapted to overlap the free end of the arm 18 and the bolt 46 passes through the opening 44 and is screwthreaded into the opening 26 in the arm 18. In its final position the head 48 of the bolt abuts against the face 42 of the arm 28 and rigidly holds both clamping arms in position and secures the rim 14 rigidly on the frame 10. In their final clamping position the lower portions 50 and 52 of the arms 18 and 28 rest on the rim 10 as shown in Fig. 3.

The arm 28 is provided at its outer face portion with a recess 54 which forms a seat at 56, the purpose of which will be later described.

In order to hold the arms in locked position and prevent theft of the tire there is provided a covering member 58 having an outer hollow portion 60 adapted to house and completely conceal the head 48 of the bolt 46. The bottom of the hollow portion 60 is provided with the hook or tooth 62 which engages under the seat 56 in the final position of the parts as shown in Fig. 3. The inner portion 64 of the covering member 58 extends over the juxtaposed ends of the arms 18 and 28 and conceals the ends of both arms. The uppermost part of the end 64 is provided with an opening 66 in which the barrel of the lock 40 is adapted to be positioned. The barrel as well as its locking finger 68 extends down through the opening 38 in the portion 36 of the arm 28 and extends closely adjacent to the upper surface of the arm 18 as shown in Fig. 3. The parts in Fig. 3 are shown in locked position and in order to unlock the parts, a key is inserted in the lock 40, the locking finger 68 turned through 90 degrees which will throw it from underneath the portion 70 and into the opening 38 of the arm 36. This will allow the covering member to be removed as a whole which will expose the head 48 of the bolt and permit the application of a wrench or suitable tool to unscrew the bolt and loosen the clamps 18 and 28.

Figure 2:
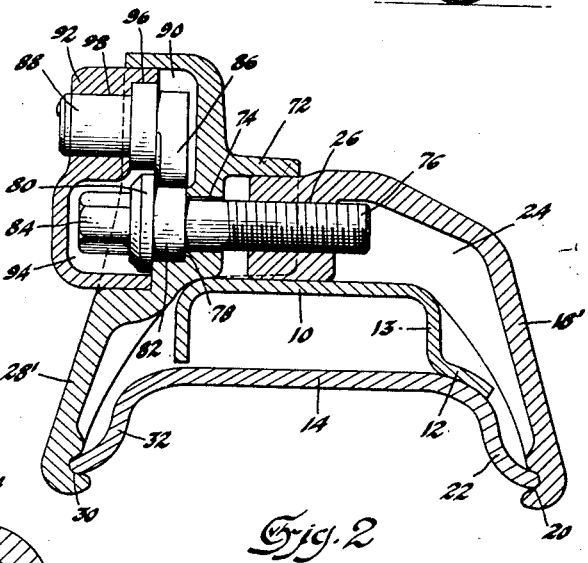
Fig. 2 is a section on the line 2—2 of Fig. 1, through the one form of the invention, but with the tire omitted.

Referring to the species of Fig. 2 it will be seen that the arm 18' is similar to the arm 18 of Fig. 3, except that it is somewhat shorter.

The arm 28' extends upwardly over the rim 10 in juxtaposed relation with the end of the arm 18'. The arm 28' is provided with a hollow or housing portion 72 completely enclosing the end of the arm 18. A bolt opening 74 is provided and a bolt 76 is passed through the opening 74 and screwthreaded into the opening 26 of the arm 18'. The bolt 76 has rigidly secured thereto the collar 82 forming a shoulder 78 which strikes against the face of the arm 28' and having a flange 80 which is positioned at the end of the collar 82 at the polygonal head 84. The function of the flange 80 is to engage the latch or locking lug or dog 86 of the lock 88 when the parts are in locked position.

The arm 28' is provided with a recess 90 adapted to receive the end of the bolt 76 as well as a covering member 92. The covering member 92 is provided with a hollow portion 94 adapted to seat in the hollow 90 as shown at 96. Hollow portion 94 completely covers or conceals the head of the bolt and completely fills out the hollow portion 90. The covering member 92 is provided with an opening 98 in which the barrel of the lock 88 is seated.

The locking position of the parts is shown in Fig. 2. To unlock the parts the key is inserted in the barrel and the locking dog 86 turned through 90 degrees which will move the dog away from engagement with the annular flange 80 of the collar 82 and allow the covering member 92 to be withdrawn. A wrench or suitable tool may now be applied to the head 84 and the bolt 76 unscrewed to release the clamps 18' and 28'.

Referring to the species of Fig. 7, it will be seen that clamping arms 18" and 28" have been provided for the same purpose as the arms 18 and 28 in Fig. 3. The arm 18" is provided with threaded opening 100 adapted to receive the threaded end 102 of a bolt 104 having a head 106. The end 108 of the arm 18" is hollow or recessed as shown at 110 for the purpose of receiving the end 112 of the clamping arm 28", the end 112 being provided with an opening 114 adapted to receive the bolt 104.

The end 108 is provided with an opening 109 to receive the end 112 of arm 28" and with an enlarged portion 116 having the shoulder portions 118 adapted to be engaged by lugs or locking dogs 120 of the lock 122. A suitable shoulder 123 is provided on the arm 28" to overlap and form a tight connection with the enlarged portion 116 in secured position. The lock 122 is positioned in an opening 124 of the covering member 126.

The locked position of the parts is shown in Fig. 7. To unlock the parts the key is inserted in the lock 122 and the lock rotated to throw the lugs or dogs 120 out of engagement with the shoulders 118. When the dogs have been removed from engagement with the shoulders the covering member 126 and the lock may be withdrawn from the locking member 18". This will expose the head 106 of the bolt and permit the insertion of a suitable tool to unscrew the bolt and free the clamps 18" and 28".

Referring to the species of Fig. 8, the clamping arms 18''' and 28''' have been provided for the same purpose as the arms 18 and 28 shown in Fig. 3. The end of the arm 18''' engaging the flange 22 of the rim may be broad or narrow as desired. If a narrow connection is used a piece of rounded stock may be used. The arm 18''' is bent as shown at 128 and has the free end 130 of its shank portion screwthreaded, adapted to receive a nut 132 provided with an annular flange 134 and a suitably shaped head 136 adapted to receive a wrench or other suitable tool.

The second arm 28''' extends upwardly over the ring 10 as in the other species and has an opening 138 adapted to freely receive the shank portion of the arm 18'''. The arm 28''' has the face or shoulder 140 against which the nut 132 abuts in the secured position of the parts as shown in Fig. 8. The arm 28''' is also provided with a recess 142 in which the locking dog or lug 144 of the lock 146 is adapted to engage. In the locking position as shown in Fig. 8, the locking dog 144 engages in or under the projection 148 formed by the recess 142.

Over the nut 132 and the face 140 of the clamping member 28''' there is adapted to seat the covering member 150 having the hollow portion 152 to house the nut 132. The hollow portion 152 is provided with an extension or flange 154 adapted to fit between the annular flange 134 and the face 140. The lower portion of the cover member 150 fits over the projection 148 and in the final position of the parts as shown in Fig. 8 the covering member 150 houses and completely conceals the exposed ends of the nut and threaded portion 130 of the arm 18'''.

The parts are shown in locked position in Fig. 8 and to unlock the same, a key is inserted in the lock 146 and the locking dog 144 turned through 90 degrees. This will free the dog from the recess 142 and projection 148 and permit the withdrawal or removal of the covering member 150. This will expose the head 136 of the nut and permit the nut to be unscrewed from the end 130 by the application of a wrench or suitable tool.

I claim:

1. In a lock for tires mounted on a frame rigidly positioned on a vehicle, a rim for said tire, a pair of clamping arms engaging the tire rim and extending over the frame and overlapping each other, means extending through the overlapped portions to rigidly hold said frame, rim, and arms together, a covering member extending over the overlapped portions and concealing said means, and a lock for said covering member.

2. In a lock for tires mounted on a frame rigidly positioned on a vehicle, a rim for said tire, a clamping arm engaging on the edge of the tire rim and extending over the frame, a second clamping arm engaging the other side of the tire rim and having its end extending about the end of the first clamping arm, a headed bolt passing through the second arm and screwthreaded into the first, a covering member extending over the adjacent ends of said arms and concealing the head of the bolt, and a lock on said covering member.

3. The invention of claim 2, said covering member removable from said arms when said lock is unlocked.

In testimony whereof I affix my signature.

LLOYD BLACKMORE.